(12) United States Patent
Hansen

(10) Patent No.: US 6,250,207 B1
(45) Date of Patent: Jun. 26, 2001

(54) APPARATUS FOR A HEAT TREATMENT OF A PARTICULAR FOOD PRODUCT

(75) Inventor: Ejner Björn Hansen, Odense (DK)

(73) Assignee: PLF International A/S, Svendborg (DK)

(*) Notice: Subject to any disclaimer, the term of this patent is extended or adjusted under 35 U.S.C. 154(b) by 0 days.

(21) Appl. No.: 09/438,543

(22) Filed: Nov. 12, 1999

Related U.S. Application Data

(63) Continuation of application No. PCT/DK98/00052, filed on Feb. 17, 1998.

(30) Foreign Application Priority Data

May 16, 1997 (DK) .................................................. 0571/97

(51) Int. Cl.[7] .............................. A23N 12/10; F26B 11/04
(52) U.S. Cl. ........................... 99/286; 99/443 R; 99/469; 99/475; 99/476; 99/479; 34/132; 34/140
(58) Field of Search ...................... 99/286, 427, 443 R, 99/469, 475–479; 34/108, 132, 140

(56) References Cited

U.S. PATENT DOCUMENTS

| | | | |
|---|---|---|---|
| 4,642,906 | * | 2/1987 | Kaatze et al. ............................. 34/13 |
| 4,776,319 | * | 10/1988 | Colangelo et al. ................. 126/41 R |
| 5,780,815 | * | 7/1998 | Mestnik et al. ...................... 219/400 |

FOREIGN PATENT DOCUMENTS

| | | |
|---|---|---|
| 2401387 | 3/1979 | (FR) . |
| 2720483 | 12/1995 | (FR) . |
| WO95/13734 | 5/1995 | (WO) . |

\* cited by examiner

*Primary Examiner*—Keith Hendricks
*Assistant Examiner*—Drew Becker
(74) *Attorney, Agent, or Firm*—Pennie & Edmonds LLP

(57) ABSTRACT

A chamber serving for a heat treatment of a particular food product, which for example can be pre-processed potato pieces which are to be prepared as French fried potatoes, and therefore have a content of evaporable substances, such as fat. In the chamber is a grid for, during operation, carrying the product, and one or more quartz lamps for generating heat for the process. The chamber is furthermore fitted with an exhaust channel which via a filter device connects the chamber to the open. Above the grid is placed a cabinet which is open at the bottom, for mounting the quartz lamps. The cabinet is via an inlet duct connected to the open. In the inlet duct is placed a ventilator for sending an air flow into the cabinet via the inlet duct. The air acts as a shield which keeps for example fat vapors at a distance so that they cannot come into contact with the quartz lamps and disintegrate in the high temperature of these. Thereby, it is prevented that unhealthy and malodorous substances are produced during the process. The air shield furthermore cools the quartz lamps, which thereby will attain a long life.

13 Claims, 2 Drawing Sheets

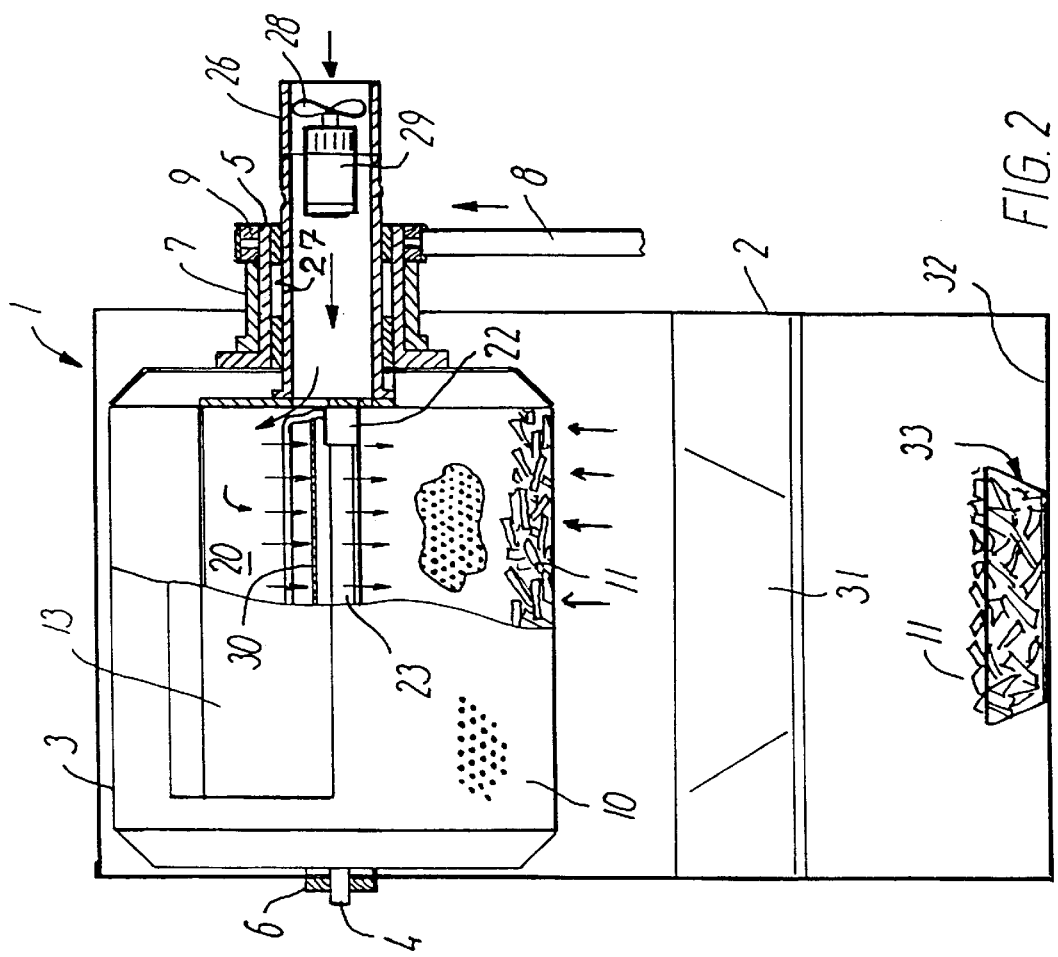
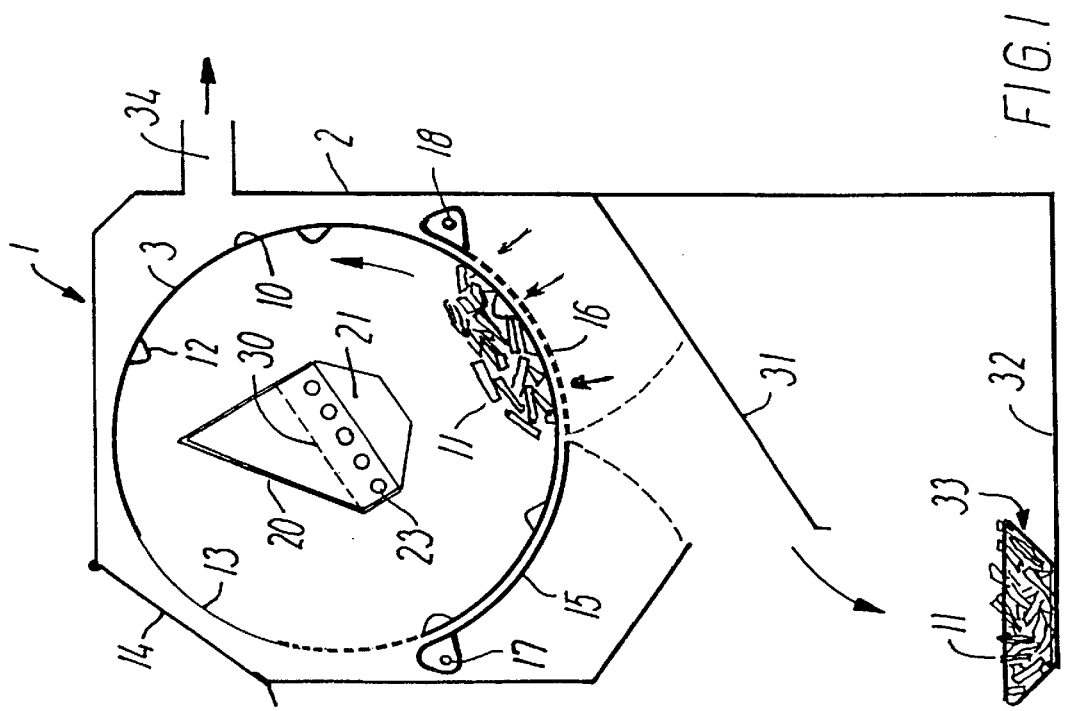

APPARATUS FOR A HEAT TREATMENT OF A PARTICULAR FOOD PRODUCT

CROSS-REFERENCE TO RELATED APPLICATIONS

This application is a continuation of co-pending International Application No. PCT/DK98/00052, filed Feb. 17, 1998.

FIELD OF THE INVENTION

The invention relates to an apparatus for a heat treatment of a particular food product with a content of evaporable substances, such as fat, in a treatment chamber in which the product is subjected to heat stress from a heat source, in the form of, for example, one or more quartz lamps, and the gases, which the product gives off in the process, are sucked off by means of a ventilator in an air flow, which via a filter device for removing the gases from the air and an air connection between the filter device and the treatment chamber, are discharged into open air, whereby the air connection is constructed as a convector, and whereby the chamber comprises means for ventilating the heat source.

BACKGROUND OF THE INVENTION

A popular particular food product are French fried potatoes which, in considerable amounts, are served in portions in restaurants, grill bars, cafeterias or in the street from hot-dog stands. French fried potatoes are served either alone as a meal by themselves or in connection with other courses. In any case, there will be a demand for French fried potatoes being freshly heated and crispy immediately after the order has been placed. Since French fried potatoes are unsuitable for long term keeping in this condition, the preparation must necessarily take place by means of a process which quickly and easily can transform the raw and possibly pre-processed material into the ready product.

This demand is to the utmost fulfilled by deep-fat frying, where a basket containing a portion of potato strips is lowered into a pool of melted lard or cooking oil. The lard or the oil is quickly absorbed by the potato strips which thereby are heated and given a crispy and crunchy consistency with an almost brown color, mainly deriving from a caramelizing of the sugar content of the potato pieces.

When the potato pieces are treated in this way, they will as French fried potatoes have a fatty or oily content of 30%. Considering the very big amounts of French fried potatoes which over the years are consumed especially in the industrialized countries, this otherwise so popular food product can be a serious threat to national health. Frequently consuming too much fat could in the long run be deposited as fatness and cause various diseases.

In order to eliminate these problems, various apparatuses have been invented concerning treatment of pre-processed potatoes containing a relatively low content of fat. With these apparatuses, it is possible to make crispy and tasty French fried potatoes with a moderate fatty content of approximately 6%.

In this way, the problem of the high fatty contents in deep-fried potatoes has been relieved, but in deep-frying as well as in more simple apparatuses, it still is a big problem that the process sends smoke and smell out into the surroundings to the inconvenience of the serving staff and the customers present in the room. Some apparatuses have therefore been supplied with filters for cleaning the air before it reaches the room. Neither of these apparatuses have fully lived up to the demands made on them.

The apparatus as invented is suitable for treatment of pre-fried potato pieces with a fatty content of, for example, approximately 6%. The potato pieces also contain water which partly has to be removed in order to obtain the crisp and crunchy consistence of the potato pieces which is characteristic of French fried potatoes. This means that a successive renewal of the air in the treatment chamber has to take place as the process otherwise will be hampered or stopped, when the air in the chamber has been saturated with vapor.

The air renewal takes place when the ventilator sucks air out of the treatment chamber while fresh air is pressed into it via an opening for influx of air in the wall of the chamber. In this way, an air flow is produced which is to be thrown off into the open. Out of consideration for the surrounding environment, it is, prior to that, necessary to let the air flow pass the filter device to remove the air contents of vapor, fat, smell and other impurities.

The temperature of the air in the treatment chamber can reach about 250° C. at least in the final step of the process. If air with such a high temperature is sent through the filter device, this might be damaged and might work with reduced effectiveness so that the air will not be cleaned satisfactorily. To relieve this problem, the air flow could be increased in excess of the optimum progress. However, that would imply extra running expenses for heating the additional air volume and furthermore both ventilator, filter and other construction details of the apparatus would have to be laid out with correspondingly large dimensions, whereby the apparatus would be clumsy and bulky, and it would be exorbitantly costly to produce.

By using the air connection between the treatment chamber and the filter device as convector, the air can now be cooled down to a temperature most suitable for the filter device. Normally, the various components will be built in a cabinet. In the wall of the cabinet, it would be a good idea to construct holes as well above as under the area where the convector is placed. The buoyancy in the heated air surrounding the convector will then force a secondary air flow past the convector, whereby the primary air flow in the convector is cooled down. In the same way, a secondary air flow can be sent past areas of the cabinet wall which are close to the very hot treatment chamber. Thereby, these areas are cooled and will therefore not be uncomfortably hot for the persons who are to operate the apparatus.

When the components of the apparatus are built in a cabinet, it will be appropriate to construct a lead-in opening with a corresponding door in both cabinet and treatment chamber. By interconnecting the two doors with a suitable rod system, they can be made to open and close simultaneously. The serving staff will therefore only have to open the outer door of the cabinet to get immediate access to the treatment chamber when this has to be filled with a new portion of potato pieces. In this connection, the two doors can be hinged in such a way that they, in open position, together form a lock between the treatment chamber and the cabinet, through which the product easily and safely can be poured into the treatment chamber.

The convector can be constructed in many different ways within the scope of the invention. Thus, it can be constructed as a channel with ribs which give the convector a large surface for effectively transmitting the heat contents of the primary air flow to the secondary air which flows past the convector. In an especially advantageous embodiment, the convector can consist of a number of heat-conducting pipes which are placed at intervals side by side in such a way that the secondary air flow can pass between the pipes which for example can be made of copper or another heat-conducting material.

For heating the potato pieces, radiant heat from, for example, quartz lamps can advantageously be used. This is a very intensive form of energy providing a quick and precise heat treatment of the potato pieces with minimum energy loss to the surroundings. The heat-ray element will then naturally be placed inside the treatment chamber which may be constructed in different ways. For example, the chamber may be a rotating cylinder in which the potatoes during the rotation are tumbling between each other and are therefore uniformly irradiated on all sides. In a preferred embodiment, the treatment chamber is stationary, and the potato pieces will be rotated by rotating a driving wheel with carriers.

The stationary construction of the treatment chamber means that the inlets and outlets and the closing mechanism of these can be constructed in a simple and reliable mainer. The out-let can thus conveniently be constructed permanently in the bottom area of the treatment chamber. In this way, the ready French fried potatoes will automatically fall out under the influence of the gravitational pull when a slide gate in front of the emptying opening is pulled away. By letting the driving wheel continue to rotate during this, a complete emptying of the treatment chamber takes place.

The French fried potatoes fall through a shaft which is constructed in the cabinet and has an opening at the bottom, through which a sleeve for collecting the French fried potatoes can be inserted. The fresh French fried potatoes will immediately after the heat treatment continue to smell, however, the smell will be sucked into the treatment chamber via its air in-let, as the ventilator under this will continue to be operating.

An apparatus of the above named type is known from patent application WO 95/13734.

In this apparatus which, as mentioned, subject the potato pieces to intense radiant heat, the quartz lamps for heating the potatoes will necessarily have to operate with a rather high surface temperature, which for example can exceed 800° C. At such high temperatures, there is a risk that substances in the vapors, which the potato pieces give off when they are irradiated, can disintegrate near or on the quartz lamps and form malodorous and unhealthy compounds of, for example, aldehydes which can be both saturated and with a double bond in 2-position.

As example of such aldehydes can be mentioned acrolein or 2-propenal which has a pungent and unpleasant smell, and higher unsaturated aldehydes which smell like acrolein though with a slightly less strong and pungent smell.

SUMMARY OF THE INVENTION

In order to eliminate these disadvantages, it is the object of the invention to show a heat treatment chamber of the kind mentioned in the opening paragraph which is arranged in such a way that the vapors, which the potato pieces give off when they are irradiated, cannot come near or into contact with the heat source.

Another object of the invention is to keep the temperature of both the heating element and its immediate surroundings at an appropriately low level.

This is, according to the invention, achieved by the fact that the chamber comprises means to ventilate the heat source. The ventilating air blows the vapors in the chamber away from the heat source and its immediate surroundings, whereby the content of the vapors of, for example, fats and oils is secured against the disintegration which could occur if the vapors were to enter the very hot zone near the heat source or came into direct contact with its surface. The heat source is furthermore cooled to a pre-chosen temperature whereby it will attain a long life.

By simultaneously cooling the immediate surroundings of the heat source, it is prevented that, for example, fat vapors which come near or into contact with the immediate surroundings of the heat source disintegrate.

According to the invention, the means for ventilating the heat source comprise an exhaust channel which, if convenient, via a filter device connects the chamber to the open, an open cabinet placed in the chamber above the grid for supporting the food product for mounting the heat source, an inlet duct connecting the cabinet to the open, and at least one ventilator for sending an air flow into the cabinet via the inlet duct. Thereby, an air flow is formed past the heating element for keeping the vapors from the process at a distance of both the heating element and the cabinet, which, at the same time, both are cooled to a predetermined temperature.

The opening of the cabinet can, according to the invention, advantageously face the grid where the product which is to be heat treated is located. When the heat source is extending along the opening, and the air duct ends behind the heat source, the air flow passing through the cabinet opening will effectively blow the vapors from the process away from the heat source.

To ensure that the air flow obtains a uniform course in the full extent of the heating element, a perforated air distributor plate can, according to the invention, be put in between the mouth of the inlet duct in the cabinet and the heat source. This plate can furthermore be bright on at least the side facing the heat source, whereby the air distributor plate, at the same time, obtains an advantageous effect as a reflector to the heat source.

A chamber in which a food product is to be heat-treated or prepared, must frequently be flown through by fresh air for absorbing and removing steams, fat vapors and other vapors which the product might give off when it is heated. If the vapors are not removed, the process will not be able to pass off satisfactorily, and the finished product will therefore not obtain the desired quality. In case of many food products, for example French fried potatoes, it is desired that they are prepared with a crisp and delicious crust which require admission of oxygen which exactly is present is the passing air.

The air flow which therefore is necessary to optimally prepare a tasty food product in the chamber, can, in one embodiment, be formed merely by the air serving to ventilate the heat source.

In an advantageous second embodiment, the air flow can be made up by a first and a second air flow, whereby the first air flow is led into the chamber via the inlet duct and the second via the grid which carries the food product. Thereby, it is ensured that all parts of the product will come into contact with the necessary volume of fresh air.

The air flow or flows furthermore have the effect that a part of the heat from the heat source is transmitted to the product through convection. At the same time, the heat is distributed evenly around the product which thereby receives a complete uniform heat treatment on all its parts.

The convection and heat distribution will be especially effective, if the first air flow is directed towards the grid and the second towards the heat source cabinet. In the zone where the two air flows meet, a strong turbulence is created which furthers the convection and ensures an effective heat distribution around the food product.

In the known structure, the grid is formed as a perforated wrapping on a rotating cylinder. When the cylinder during operation rotates, the individual parts of the particular product are tumbling between each other and are thereby advantageously tossed in such a way that all sides of all parts of the product are subjected to the same uniform and even heat stress of the heat source.

By providing the cylinder with journals which are journaled in bearings mounted on the cabinet wall, and by giving one of these journals a through axial hole, the inlet duct can furthermore be shaped in a pipe extending in through this axial hole and attached to the cabinet. In this case, at least one of the ventilators for sending an air flow into the cabinet can furthermore advantageously be mounted in or at the end of this pipe.

The invention will be explained in greater detail below, describing only exemplary embodiments with reference to the drawing.

BRIEF DESCRIPTION OF THE DRAWINGS

FIG. 1 is a lateral view of a cross section of a treatment chamber according to the invention;

FIG. 2 is the same, but seen from the front and partly in section; and

DETAILED DESCRIPTION OF THE INVENTION

Figure 3:
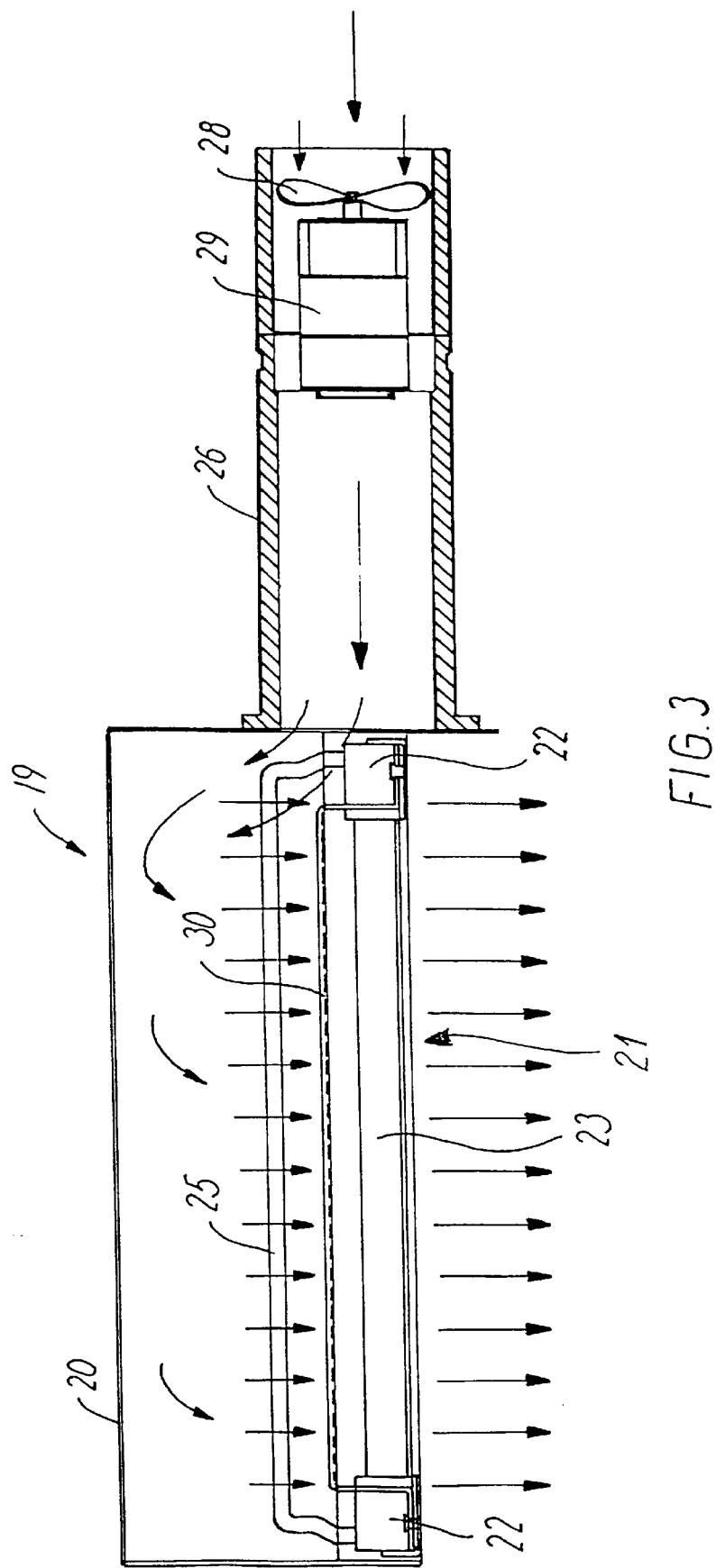
FIG. 3 shows, on an enlarged scale, a heat-source arrangement for the treatment chamber shown in FIGS. 1 and 2.

In FIGS. 1 and 2, a treatment chamber according to the invention is designated in toto by the reference number 1. The chamber is built up as a cabinet 2 in which a rotating cylinder 3 is placed. The cylinder is carried by a left journal 4 and a right journal 5, which run in bearings, 6 and 7 respectively, which are fastened to the cabinet walls. The cylinder 3 is made to rotate by means of an engine (not shown) which, with a belt 8 around a pulley 9 on the right journal 5, drives the cylinder.

The cylinder 3 has a perforated wrapping 10 which functions as a grid to a food product 11, which in the following is assumed to be pre-processed potato pieces which, by heating in the chamber, are to be prepared as French fried potatoes. On the wrapping 10 of the cylinder 3, a number of low carriers 12 are mounted which toss the potato pieces when the cylinder rotates.

The potato pieces 11 can in portions be poured into the cylinder via an opening 13 in the wrapping when a swingable lid 14 in the cabinet 2 is lifted.

Close beneath the wrapping 10 of the rotating cylinder 3 is placed two swing flaps, 15 and 16 respectively. The flaps can by means of a not shown swing mechanism be made to swing around pivots, 17 and 18 respectively, from the closed position shown in FIG. 1 to the open position indicated by a dotted line.

As mentioned, the flaps 15 and 16 are placed close beneath the wrapping 10 of the cylinder. As the flaps furthermore follow the wrapping along a curve with the same axis as the wrapping, the flaps will, in closed position, assume a part of the function of the wrapping as a grid, when the opening of the wrapping passes the spot above the flaps where the potato pieces 11 are tumbling around while the cylinder is rotating. For this reason, at least one of the flaps, for example the flap 16, can be shaped as a grid which, in this case, consists of a perforated plate.

In the cylinder is placed a heat-source arrangement, which can be seen on an enlarged scale in FIG. 3 and which in toto is designated by the reference number 19.

The heat-source arrangement comprises a cabinet 20 which at the bottom has an opening 21. In sockets 22, which are attached in the cabinet 20 at the opening 21, there is placed a total number of, in this case, five quartz lamps 23. A wire 25 is serving for supplying the quartz lamps with the necessary electricity.

The cabinet 20 is attached to a pipe 26 which, from the open, is extending into the cylinder 3 via a through axial hole 27 in the right journal 5. In the pipe 26, there is furthermore placed an axial-flow fan 28 which is driven by a motor 29. A perforated plate 30 is furthermore placed in the cabinet 20 behind the quartz lamps 23.

When a portion of French fried potatoes is to be prepared, the operator opens the lid 14 and pours a portion of pre-processed potato pieces in through the opening 13 of the cylinder 3 which, during this, is made to stop at the lid 14 by means of a pre-programmed control (not shown).

The control then makes the cylinder rotate in the direction of the arrow for an adequate period of time, for example, a couple of minutes, while the potato pieces are tumbling around in the bottom area of the cylinder a bit above the middle in the direction of rotation.

At the same time, the quartz lamps are lighted, and as the opening 21 of the cabinet 19, as shown, is facing the potato pieces 11, these now receive an intense flow of heat from the quartz lamps. Thereby, the potato pieces are heated quickly and safely to a temperature where the substances which the potato pieces consist of, undergo a number of chemical and physical processes which in, for example, a couple of minutes transform the potato pieces into ready-to-serve French fried potatoes.

At this point, the control (not shown) activates the swing mechanism (not shown) which thereby swings open the flaps 1, 16 so that the hot French fried potatoes via a chute 31 can glide down into a sleeve 33 on a table 32 under the chute 31. A portion of finished, hot French fried potatoes are now ready to be served, and the preparation of the next portion can begin.

The potato pieces have a content of, among other things, water, which have to be removed during preparation in order to obtain the desired consistence of the finished French fried potatoes. When the potato pieces are heated to an adequate temperature, a part of their contents of water, fat and other substances vaporize. The vapors spread into the chamber which quickly would be filled with saturated vapors to an extent which would stop or slow down the further course of the process if the vapors were not successively removed from the chamber.

During operation, the chamber is therefore supplied with fresh air for absorbing the vapors. Conflowly with the chamber being supplied with fresh air, vapor-containing air is sucked out of the chamber via an air shaft 34. The air is discharged into the open, but can, before this, advantageously be made to pass a filter device (not shown) in order to prevent that undesirable vapors and smells escape to the surrounding environment to the inconvenience of the persons who might be near by.

The content of oxygen in the air furthermore contributes to giving the French fried potatoes a crisp and delicious crust.

The chamber in FIGS. 1 and 2 shown structure is supplied with a ventilator (not shown) for sucking the vapor-containing air out of the air shaft 34. During this, the air can pass a subsequent filter device (not shown) and then be discharged into the open.

The sucking out forms a negative pressure which draws fresh air into the chamber 1 via the perforated swing flap 16 and the perforated wrapping 10 of the cylinder 3. As indicated in FIG. 1, the fresh air, during this, advantageously passes the potato pieces at the bottom of the cylinder.

According to the invention, the axial-flow fan 28, which is driven by the motor 29, furthermore blows an air flow into the cylinder 3 via the pipe 26 and the opening 21 of the cabinet. On the way, the air flow passes the perforated plate 30 behind the quartz lamps 23. The air is therefore distributed evenly and uniformly across the total area of the quartz lamps. The perforated plate 30 is bright on the side facing the quartz lamps, and the plate therefore serves for reflecting the heat radiation down towards the potato pieces at the bottom of the cylinder.

As it can be seen, the air flow has, through the swing flap 16 and the wrapping 10, direction mainly towards the opening 21 of the quartz lamp cabinet 20, while the air, which at the same time is flowing out of this opening, oppositely is directed towards the potato pieces tumbling around at the bottom of the cylinder 3.

The two air flows contribute considerably to, by means of convection, transmitting and distributing the heat to the potato pieces which thereby are ensured a uniform and precise treatment. This effect is optimized by, as mentioned, letting the two air flows blow towards each other so that a strong turbulence is created in the treatment area.

A cycle for preparing a portion of French fried potatoes will, for economical and practical reasons, necessarily have to be completed within a reasonably short timescale which typically will be around a couple of minutes. The quartz lamps must therefore be able to act upon the potato pieces with an intense heat which however presupposes that the lamps operate with a relatively high surface temperature which for example can exceed 800° C.

As mentioned earlier, there is a risk, at such high temperatures, that the substances of the vapors which the potato pieces give off when the are heated, will disintegrate at or on the quartz lamps and form malodorous and unhealthy compounds. This is prevented by the fresh air which by means of an axial-flow fan 28 is blown into the cylinder 3 via the pipe 26 and the cabinet 20. The air acts as a shield which keeps the mentioned vapors at a distance of the quartz lamps 23 and their immediate surroundings, for example the cabinet 20.

The air shield furthermore cools the quartz lamps and the cabinet. When the quartz lamps in this way are kept at a predetermined low temperature, they are ensured a relatively long life. The cooling of the cabinet eliminates at the same time the risk of vapors, which might come in contact with the cabinet, disintegrating.

With reference to the drawing, the invention is described above on the assumption that the treatment chamber had a rotating cylinder, and sucking out vapor-containing air took place via a filter device.

Within the scope of the invention, the treatment chamber can, however, be designed in many other ways. In this way, the chamber can, for example, simply be in the nature of an oven with a built-in grid.

The essential is that an air shield is created around the heat source for cooling it and keeping vapors of, for example, fats at a distance so that they do no disintegrate.

It should be understood that variations and modifications within the spirit and scope of the invention may occur to those skilled in the art to which the invention pertains. Accordingly, all expedient modifications readily attainable by one versed in the art from the disclosure set forth herein that are within the scope and spilit of the present invention are to be included as further embodiments of the present invention. The scope of the present invention accordingly is to be defined as set forth in the appended claims.

What is claimed is:

1. A heat treatment apparatus for a food product having a content of at least one evaporable substance comprising:

a treatment chamber;

a rotatable cylinder disposed in the treatment chamber and having a perforated wrapping functioning as a grid for supporting the food product;

a plurality of journals for carrying the rotatable cylinder, at least one of these journals having a through axial hole;

a plurality of bearings fastened to the treatment chamber for accommodating the journals of the rotating cylinder;

an open cabinet is disposed in the cylinder;

a heat source which is secured in the open cabinet and is disposed above the food product in the cylinder so as to subject the food product to heat stress from the heat source, thereby evolving gases from the at least one evaporable substance;

an inlet duct connecting the open cabinet to the atmosphere, which is formed by a pipe attached to the treatment chamber extending through the at least one journal having a through axial hole;

at least one first fan for moving fresh air from the atmosphere to the open cabinet via the inlet duct;

a filter to capture gases evolved from the heated food product;

an air connection device extending between the treatment chamber and the filter; and a second fan to move air contaminated with the evolved gases through the air connection to the filter for removing gases from the air and releasing the cleaned air to the atmosphere.

2. The apparatus of claim 1, wherein an opening in the open cabinet faces the perforated wrapping, the heat source extends along the opening, and the inlet duct ends at an opposite side of the heat source from the opening.

3. The apparatus of claim 1, wherein the heat source comprises at least one quartz lamp.

4. The apparatus of claim 1, wherein the air connection device comprises a convector.

5. The apparatus of claim 1, wherein the open cabinet further comprises a perforated air distributor plate located between the opening of the inlet duct in the open cabinet and the heat source.

6. The apparatus of claim 5, wherein the perforated air distributor plate has two sides and at least the side facing the heat source has a finish adapted to reflect radiation from the heat source.

7. The apparatus of claim 1, wherein the inlet duct directs a volume of fresh air into the open cabinet and then the treatment chamber to oxidize the food product and remove gases generated when the food product is heated from the treatment chamber.

8. The apparatus of claim 1, wherein the fresh air is supplied in a first air flow through the inlet duct and in a second air flow through the perforated wrapping.

9. The apparatus of claim 8, wherein the first air flow and the second air flow have opposite directions.

10. The apparatus of claim 1, wherein at least one of the first fans is secured to an end of the pipe.

11. The apparatus of claim 1, wherein the treatment chamber further comprises a lid for placing the food product adjacent the perforated wrapping.

12. The apparatus of claim 1, wherein the perforated wrapping further comprises at least one releasably pivotable flap capable of permitting the heated food product to be removed from the treatment chamber.

13. The apparatus of claim 1, wherein the heat source comprises radiation.

* * * * *